UNITED STATES PATENT OFFICE.

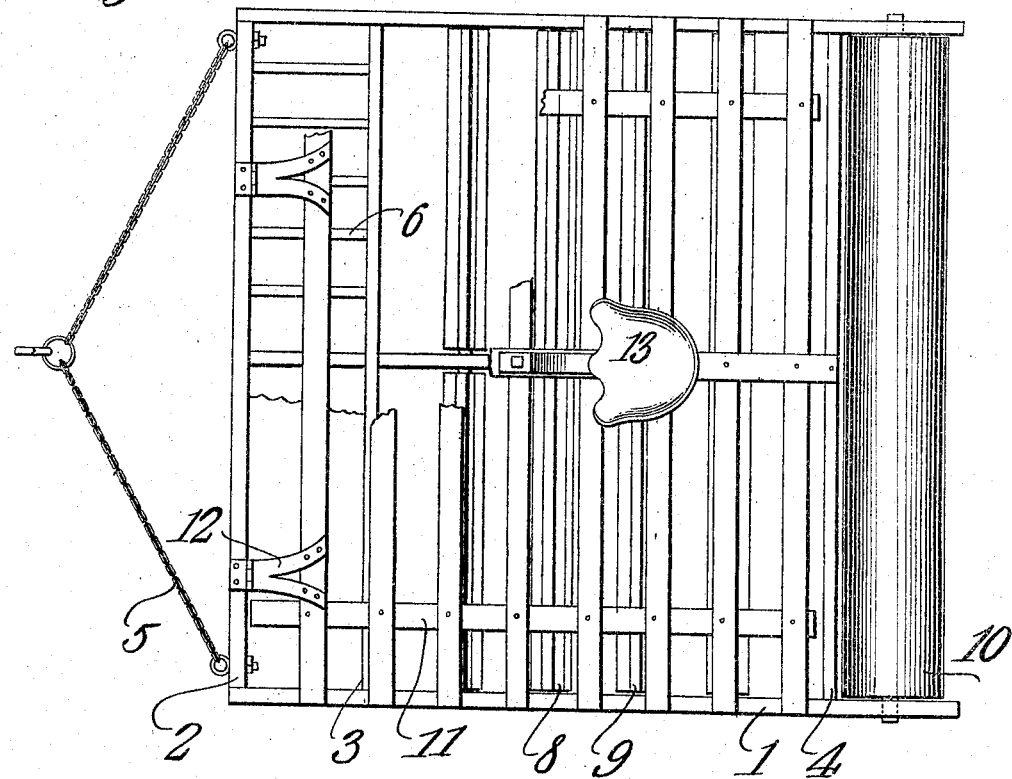
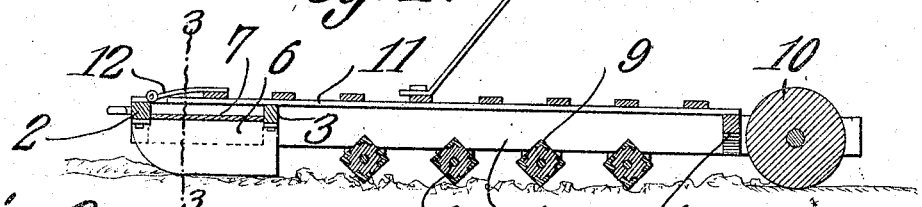
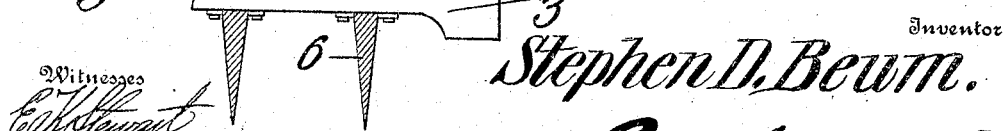

STEPHEN D. BEUM, OF CLEVELAND, OHIO.

SOIL-PULVERIZER.

No. 900,822.

Specification of Letters Patent.

Patented Oct. 13, 1908.

Application filed January 14, 1908. Serial No. 410,838.

*To all whom it may concern:*

Be it known that I, STEPHEN D. BEUM, a citizen of the United States, residing at Cleveland, in the county of Cuyahoga and State of Ohio, have invented a new and useful Soil-Pulverizer, of which the following is a specification.

This invention has relation to soil pulverizers and it consists in the novel construction and arrangement of its parts as hereinafter shown and described.

The object of the invention is to provide an agricultural implement adapted to be drawn over the ground and which is provided with vertically disposed parallel blades for cutting the soil. A series of non-circular clod crushers is journaled for rotation upon the same and a pulverizing roller is located behind the clod crushers.

In the accompanying drawing: Figure 1 is a top plan view of the implement. Fig. 2 is a longitudinal sectional view of the same, and Fig. 3 is a transverse sectional view of a portion of the implement cut on the line 3—3 of Fig. 2.

The implement consists of the rails 1 which are connected together by the transversely disposed cross rails 2, 3 and 4. The rail 2 is located at the forward end of the implement. The rail 3 near the forward end and the rail 4 near the rear end of the same. Draft chains 5 or their equivalents are attached to the rail 2. The harrow blades 6 are vertically disposed and are attached at their upper edges to the rails 2 and 3. The blades 6 are substantially V-shaped in cross section and terminate in edges at their lower and forward portions. If desired harrow teeth may be employed instead of the blades 6. The said blades are arranged in parallel relation and lie in planes in alinement with or parallel with the line of draft of the implement. The area above the upper edges of the blade 6 and the bars 2 and 3 is closed by a bottom 7 whereby a receptacle is formed between the rails 2 and 3 which may hold tools or other weighty objects for the purpose of holding the blades 6 down in the soil as will hereinafter appear. The non-circular clod crushers 8 are journaled for rotation between the rails 1. Said crushers are preferably square in transverse section, as shown, although they may be of any other desired non-circular transverse configuration. The angles formed at the edges of the sides of the said clod crushers are protected by the metallic strips 9 which are inlaid in the corners of the said crusher in a manner as illustrated in Fig. 2. These strips may, if preferred, be inlaid in the sides of the crusher. The pulverizing roller 10 is journaled for rotation between the rear end portions of the side rails 1. Said roller may be formed from wood or metal or other suitable material. The platform 11 is connected by means of the hinges 12 to the cross rail 2 and is adapted to lie at its edges along the upper edges of the side rails 1. The seat 13 is mounted upon the platform 11. The said platform is adapted to lie over the clod crushers 8 and prevent foreign bodies from becoming entangled with the same by falling on them from above.

Thus, it will be seen that an implement is provided having at its forward end harrow blades which are adapted to cleave the soil and which are followed by rotating non-circular clod crushers which engage the soil in an irregular manner and have a pounding or beating effect upon the same which reduces the size of the clods and a pulverizing roller which forces the material into a level plain and effectually reduces the soil to a mulch and leaves the same in admirable condition for machine or hand planting.

Having thus described my invention, what I claim as new and desire to secure by Letters-Patent is:

An implement as described comprising a frame, having at its forward end a receptacle, a platform hinged to the frame and adapted to close said receptacle, harrow blades carried by the forward portion of the implement, non-circular clod crushers journaled for rotation behind the harrow blades and adapted to lie under said platform, and a soil pulverizer journaled for rotation behind the clod crushers.

In testimony that I claim the foregoing as my own, I have hereto affixed my signature in the presence of two witnesses.

STEPHEN D. BEUM.

Witnesses:
WM. R. MILLER,
WM. EVERSFIELD.